Jan. 27, 1970  E. P. BULLARD IV  3,492,192
CELLULAR PLASTIC ROOFING MATERIAL AND METHOD
OF MAKING THE SAME
Filed March 2, 1967  2 Sheets-Sheet 1

INVENTOR.
EDWARD P. BULLARD IV
BY
*John H. Midney*
ATTORNEY.

INVENTOR.
EDWARD P. BULLARD IV
BY John H. Midney
ATTORNEY

United States Patent Office 3,492,192
Patented Jan. 27, 1970

3,492,192
CELLULAR PLASTIC ROOFING MATERIAL AND METHOD OF MAKING THE SAME
Edward P. Bullard IV, Westport, Conn., assignor to Shelter for the World, Inc., Bridgeport, Conn., a corporation of Connecticut
Filed Mar. 2, 1967, Ser. No. 620,039
Int. Cl. B29d 27/00; B32b 5/20
U.S. Cl. 161—57      11 Claims

ABSTRACT OF THE DISCLOSURE

The invention disclosed is a roofing or siding material in the form of a slab or sheet of closed cell, foamed plastic having a continuous layer of small stones or pebbles completely embedded in the cellular plastic immediately adjacent one surface to provide a hard abrasion and erosion resistant surface and a continuous barrier against the passage of ultra-violet light through the material. To provide additional structural rigidity as well as to reduce the amount of the foamed plastic component required, a reinforcing material which can be lengths of dried vegetative material native to the situs of use may also be embedded within the foamed plastic interiorly of the layer of stones or pebbles. There is also disclosed a method of producing the material described by sequentially placing within a mold an evenly distributed thickness of loose stones or pebbles in overlapping relation, one or more layers of spatially distributed reinforcing material, and a uniform thickness of unblown foamable plastic. The plastic is caused to foam and expand in situ within the covered mold so as to surround and encapsulate both the stones or pebbles and the reinforcing material within the foamed plastic slab thus formed.

---

The present invention relates to an inexpensive structural material useful for roofing and siding purposes and more particularly to a material which employs a cellular plastic in combination with mineral and vegetative substances native to and readily available at the situs of use to achieve a low-cost product, and a process for producing such a material without the need for complex equipment or technical skills.

It is estimated that the dwellings of over one billion people throughout the world employ grass thatch-type roofs. It is well known that thatch roofing has inherent undesirable characteristics including the facts that it tends to leak, rot rapidly and shed debris, harbor a multitude of rodents and vermin, all of which create a serious health problem to those whom it shelters. In addition, it is highly combustible and therefore presents a dangerous fire hazard. Its continued widespread use, notwithstanding its recognized shortcomings, is primarily attributable to the lack of an improved substitute of sufficiently low cost to be within the economic capability of a significant segment of the large population now forced to live under thatch roofs.

Materials presently available as substitutes for grass thatch, such as corrugated aluminum sheet, corrugated galvanized iron and cemented asbestos, all have a unit cost per square foot which is beyond the means of the overwhelming majority of families in the non-industrialized, underdeveloped countries where thatch roofing is most extensively used. Since the manufacture of such alternative materials requires complex equipment and technical skills, and the materials must therefore of necessity be produced in highly industrialized areas and transported to the underdeveloped countries, reduction of the cost of such materials to a level which would permit any substantial use as a substitute for grass thatch does not appear to be a foreseeable possibility.

Recent developments in the technology and production capabilities of resin plastic materials, both the solid and cellular forms, have heretofore had no appreciable effect on the problem of providing a suitable and economically feasible substitute for thatch roofing. While foamed plastic material may appear to be promising in this regard, it has disadvantages including a relatively high cost when used alone and the relative softness of the material, whereas a hard, weathering surface is needed so that the material will have a reasonable life when used for roofing purposes. Moreover, upon exposure to heat and sunlight for an extended period of time, plastic materials such as foamed polyurethane are subject to degradation with the result that the material becomes crumbly and easily broken.

Accordingly, an object of the present invention is to provide a structural material having cellular plastic as a primary ingredient which is suitable for roofing and siding purposes. Other objects include the provision of such a material which is an economically feasible substitute for thatch roofing; which has a hard abrasion and erosion resistant weathering surface; which is resistant to rot and fire; which is relatively immune to the degradation effects of ultra-violet light; and which has enhanced cost, weathering and structural characteristics by virtue of the inclusion of substances generally available in quantity at little cost at the situs of use. Further objects are to provide a method for producing such a material without the need for complex equipment and technical skills, and which is capable of being performed by unskilled labor at the situs of use.

The above objects are accomplished in the present invention by providing a material usable as a roofing panel formed from rigid closed cell, foamed plastic having embedded therein a layer of mineral aggregate, such as small stones or pebbles disposed in overlapping relation, and one or more layers of reinforcing material. The layer of stones or pebbles is disposed immediately adjacent to the surface of the panel which is to be exposed to the weather and provides a hard, abrasion and erosion resistant weathering surface and also a continuous barrier to the detrimental passage of sunlight to the interior portions of the panel. The reinforcing material is preferably coarse stalks of dried vegetation native to the situs of use and provides structural strength as well as desirably reducing the amount of foamed plastic needed. The panel can be made in a simple manner by foaming and expanding the plastic in situ in a closed mold after first depositing therein an evenly distributed thickness of loose stones or pebbles on the bottom of the mold and one or more layers of reinforced material, the latter being spatially distributed and with the lengths of each layer preferably extending in different directions. The foamed plastic thus forms the continuous phase of the panel structure, encapsulating and bonding together the other ingredients which are selected from substances which are readily available in quantity at each particular situs of use.

Numerous other objects and advantages of the invention will become apparent as it is better understood from the following description, which, taken in connection with the accompanying drawings, discloses a preferred embodiment thereof.

Referring to the drawings.

Figure 1:
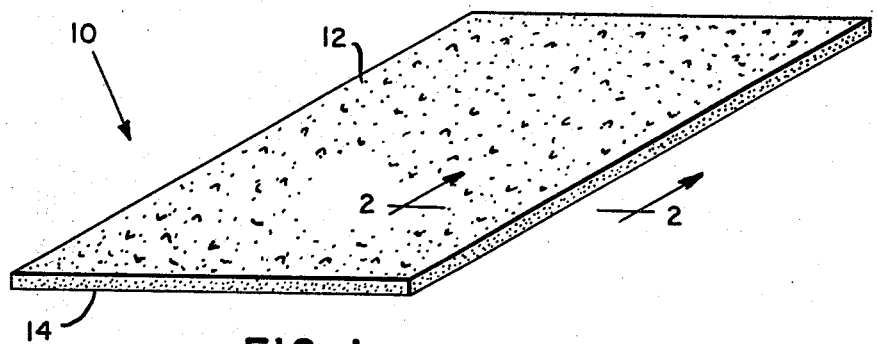
FIG. 1 is a perspective view of a roofing or siding panel embodying the instant invention.
Figure 2:
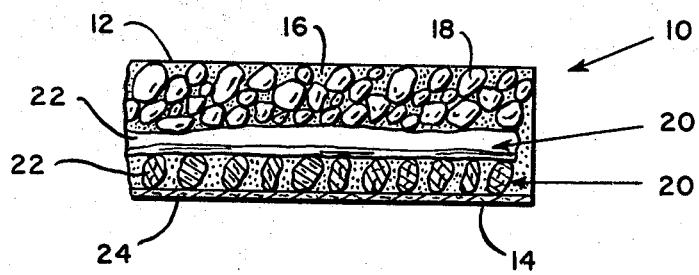
FIG. 2 is an enlarged sectional view taken substantially along the plane indicated by the line 2—2 of FIG. 1.

As a preferred or exemplary embodiment of the instant invention, FIGS. 1 and 2 show a roofing or siding panel generally designated 10 having a weather surface 12 and a surface 14 adapted to face inwardly of a building structure on which the panel is used. The panel 10 has a cellular plastic 16 enveloping and bonding together a thickness of hard mineral granules 18 which are positioned in random and overlapping relation immediately adjacent the weather surface 12. The mineral granules 18, by virtue of their proximity to the weather surface 12, impart to the surface 12 a high resistance to abrasion and erosion which would otherwise be lacking in a surface consisting solely of a low density cellular plastic material.

Any suitable foamable composition which forms a solidified, closed cell structure may be employed. To minimize the amount of the foamable composition required and thereby the cost of the panel per unit area, the cellular plastic should preferably have as low a density as is consistent with the provision of a product of adequate strength. An example of a suitable cellular plastic material is low density polyurethane foam formed by mixing an organic compound having at least two reactive hydrogen atoms, such as, for example, a polyester or a polyalkylene ether glycol with an organic polyisocyanate and water. As the polyurethane is formed, the reaction of the water with the free isocyanate content of the polymer results in the formation of carbon dioxide which is trapped in the reaction mass and expands the resin into the desired cellular structure. The structure and properties of the resulting cured polyurethane foam will depend principally upon the choice of the reactants employed and the manner in which the reaction is permitted to proceed, and products having a wide range of properties can be obtained by control of known variables. For example, the density of a foamed polyurethane can be controlled to a great extent by the amount of water employed and the temperature of the constituents during the foaming reaction. The selection of the particular reactants and the procedures to be followed to produce a desired low-density, rigid, closed cell polyurethane structure are well known to those skilled in the art and for purposes of the present invention need not be further described.

While the present invention is not limited to the use of polyurethane compositions, polyurethane foam has advantages which favor its use as a structural ingredient for the roofing panels of the present invention in that it is resistant to rot, vermin and mildew, has excellent insulating qualities, has a high strength-to-weight ratio, is abundantly available throughout the world at reasonable cost, can be formulated so that it will not support combustion, and the technology required to process the material is fairly well established. It has a disadvantage in that it is subject to deterioration and degradation when exposed for extended periods to the ultra-violet light present in sunlight. I have found, however, that this problem is minimized in the present invention by virtue of the mineral granules 18 which form an effective barrier to the passage of the ultra-violet light into the interior of the panel. Consequently, the degradation and deterioration effects are experienced to a material degree only by the exposed plastic portions at the weather surface 12, and penetration into the plastic portions at the interior of the panel and between the granules is sufficiently retarded to be of no serious consequence. Where polyurethane foam is used, however, the granules 18 are preferably opaque mineral materials which do not transmit ultra-violet light.

To reinforce the cellular plastic 16 as well as to reduce the amount of foamable composition required, one or more layers 20 of elongated, relatively coarse strands 22 may be included in the panel structure disposed interiorly of the surfaces 12 and 14. The strands 22 may be any material readily available in quantity at low cost. Since it is contemplated that the panels 10 will be formed at the location where they are to be used, the strands 22 may, for example, be lengths of dried elephant grass, dried palm stalks, dried reeds, or any other similar types of dried vegetation indigenous to the area.

The strands 22 of each layer 20 preferably extend in the same general direction, and the strands of the respective layers preferably extend in different directions, such as at right angles in instances where two layers may be used, in order to provide multidirectional structural reinforcement to the panel 10. The strands 22 of each layer 20 should generally be spaced from each other to allow the expanding plastic to penetrate through the various layers and around the granules 18 during the foaming reaction so that the individual strands and granules in the resulting product are substantially surrounded and encapsulated by the foamed plastic 16.

For the purposes which will be described more fully in connection with the preferred method hereinafter described for producing a panel 10, the surface 14 may be formed by a thin, continuous sheet material 24, which, to minimize the cost of the panel, is preferably a sheet of newspaper. Due to its porous structure, the newspaper sheet tends to become impregnated with the plastic component with the result that it firmly adheres thereto and is rendered rot and water resistant. In addition to facilitating the production of the panel 10 by means of simple and inexpensive apparatus, the smooth surface 14 formed by the sheet 24 can be readily and inexpensively finished, such as by paint or whitewash, to present an aesthetically pleasing appearance at the interior of a dwelling in which a panel may be used.

In the method of producing the roofing or siding panel of the present invention as schematically illustrated in FIGS. 3 through 7, a mold 26 is provided having an inner bottom surface 28 corresponding in shape to the desired shape of the panel 10 and side walls 30 having inner surfaces 32 extending upwardly from the bottom surface. The mold 26 may be constructed from any suitable material such as wood or metal. The inner surfaces 28 and 32 should be smooth, and if made from wood, sealed with a suitable paint or coating. Prior to each use of the mold, the surfaces 28 and 32 are preferably coated with oil, wax, or any other suitable parting agent to prevent the adhesion of the cured plastic resin thereto. Alternatively, the surfaces 28 and 32 of the mold may be provided with a permanent coating of a material which is non-adherent to the foamed plastic 16, such as for example, materials which include products sold under the trademark "Teflon" by the E. I. du Pont de Nemours Company, Wilmington, Del. In addition, the surfaces 32 may extend upwardly from the bottom surface 28 at a very slight angle of divergence to facilitate removal of a panel 10 after it has been formed.

Figure 3:
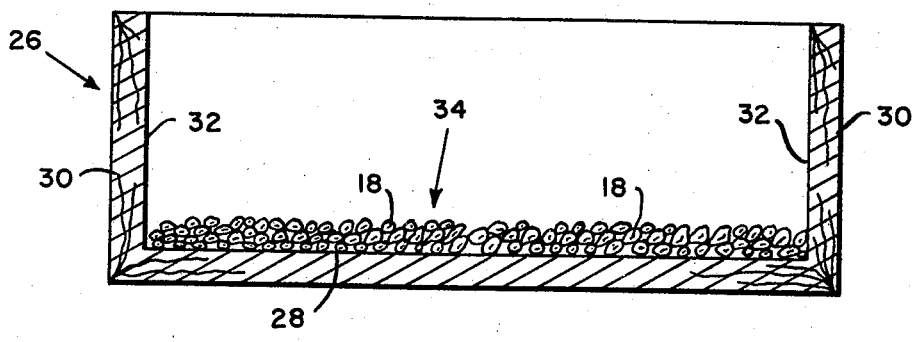
FIGS. 3 through 7 are schematic views showing the operative steps exemplifying the method of forming a roofing or siding panel in accordance with the present invention.
Figure 4:
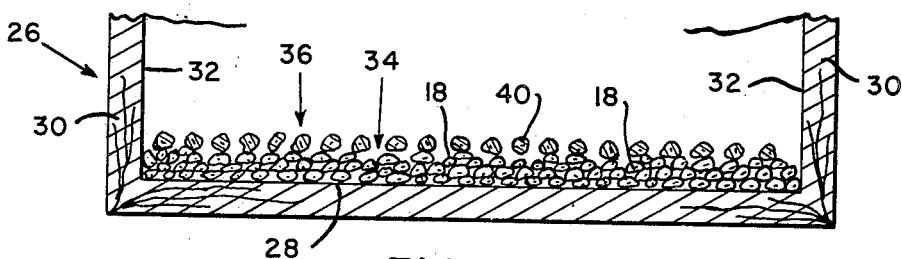
Figure 5:
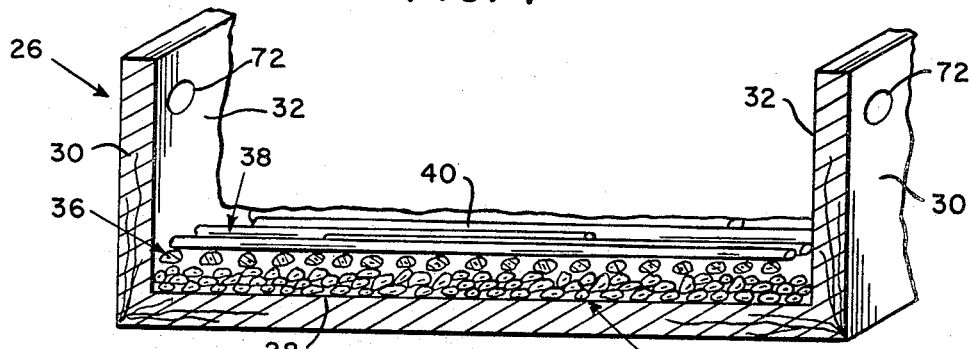

A layer 34 of loose mineral granules 18 is initially evenly distributed over the bottom surface 28 (FIG. 3). The granules 18 may be any of a variety of concreted earthy or mineral matter, such as small stones or pebbles, preferably having an opaqueness to ultra-violet light and having a size or configuration such that they will and will not pass through U.S. Standard Sieve Series Nos. 7 and 16, respectively (having sieve openings of approximately $3/16$ and $3/64$ inch respectively). For a panel 10 which is to have a final overall thickness of approximately $1/2''$, a layer 34 should preferably have a minimum thickness of approximately $5/32''$. It will be apparent that the spaces between the granules 18 which are immediately adjacent the bottom surface 28 will automatically tend to be bridged over by the next adjacent tier of granules so that the net effect will be a substantially continuous barrier to the passage of ultra-violet light through the complete thickness of the granule layer 34.

One or more layers 36 and 38 of reinforcing and filler material 40 may next be placed upon the granule layer 34 (FIGS. 4 and 5) to impart additional structural strength to the panel 10 as well as to reduce the amount of foamed plastic component 16 required. To minimize the cost of the finished panel 10, and since it is contemplated that the panels will be formed at the particular location in which they are to be used, the reinforcing material is preferably stalks of a vegetative material native to, and abundantly available at, the situs of use. Lengths of straw, hay, hard reeds, elephant grass, and palm stalks with the leaves removed and having cross sectional dimensions of $5/64$ to $11/64$ of an inch are typical of materials which may advantageously be employed. The vegetative material used should be initially dried to minimize its susceptibility to rot and mildew in the finished product and also to minimize the effect of the moisture which may be present therein on the foaming reaction, as, for example, in instances where the cellular plastic is foamed polyurethane, in which case the moisture would react with the isocyanate, thereby making it difficult to control the foaming reaction in the desired manner.

The layers 36 and 38 are preferably oriented so that the lengths of material 40 extend in the same general direction in each layer and in different directions in the respective layers. The individual stalks are spaced apart so that voids are present throughout the structure, thus permitting the expanding foam to readily penetrate throughout the mold during the foaming reaction and substantially envelop and encapsulate the individual granules 18 and stalks of material 40. Also, the ends of the material 40 are preferably spaced inwardly a slight amount from the inner surfaces 32 of the mold side walls 30 to allow the cellular plastic 16 to extend thereover and form a barrier to the absorption of moisture into the panel 10 during use by a wicking action.

Figure 6:
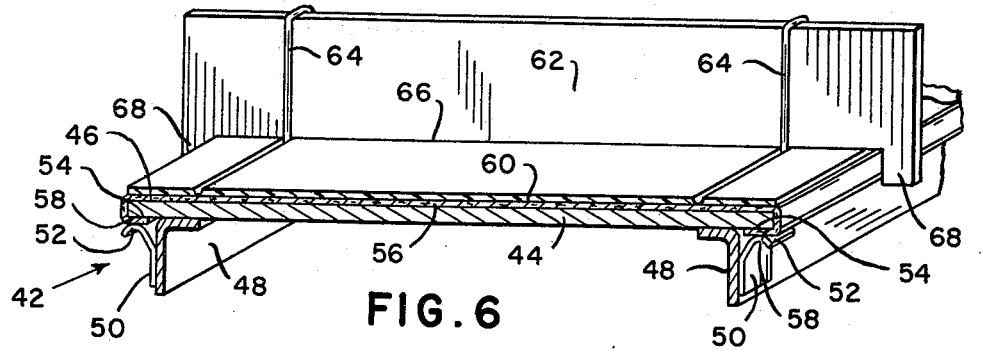

To minimize the cost per unit area of the panel 10, it is desirable to control the amount and distribution of the foam composition used. This may be accomplished by providing a mold cover 42 having a plate 44 adapted to be placed within the mold 26 with the edges of the plate closely adjacent the surfaces 32 of the side walls 30 (FIG. 6). The plate 44 has a smooth, flat surface 46 adapted to face inwardly of the mold 26 when the cover 42 is in place. Reinforcing members 48 are attached to the surface of the plate 44 opposite the surface 46 and spaced inwardly from the edges thereof. Spring members 50 attached to the reinforcing members 48 have portions 52 which are biased toward marginal surfaces 54 of the plate.

A sheet of web material, such as a sheet of newspaper 56, is placed upon the surface 46 of the plate 44 with the marginal edges 58 of the sheet folded over the edges of the plate and against the marginal surfaces 54 beneath the spring clip portions 52 to thereby hold the sheet in position on the plate. While the mold cover 42 is suitably supported with the surface 46 of the plate 44 disposed upwardly and horizontally, a quantity of premixed foamable composition 60 is deposited upon the paper sheet 56.

A scraper blade 62 is provided with spacing wires 64 having a diameter equal to the predetermined thickness of the unblown foam composition 60 which will produce the desired product. The scraper blade 62 is moved along the surface of the sheet 56 with the spacing wires 64 in contact with the surface of the sheet 56 to thereby position an edge 66 of the blade a fixed distance from the sheet and evenly distribute the foam composition thereover in a continuous layer having the desired thickness. The scraper blade 62 may be provided with guide members 68 which extend downwardly adjacent the edges of the plate 44 to maintain the transverse position of the scraper blade as it is moved relative to the sheet. In the event it may be necessary to vary the thickness of the foamable composition to achieve a desired density of the cellular plastic component 16, the spacing wires 64 may be removed and replaced with wires having a diameter equal to the thickness desired.

Figure 7:
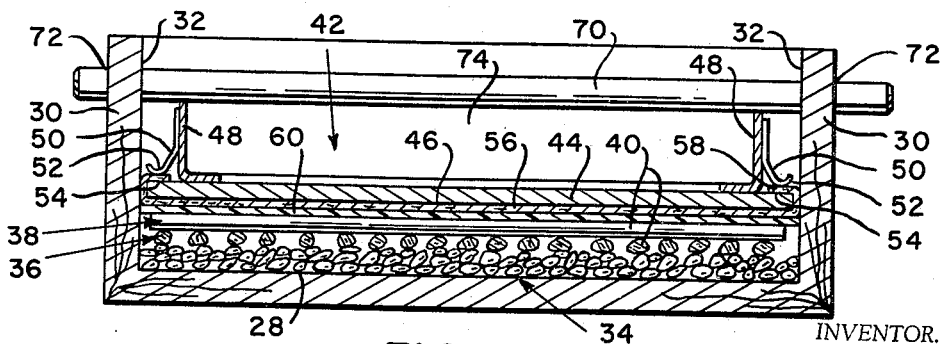

After evenly distributing the desired thickness of foamable composition 60 over the entire upwardly facing surface of the sheet 56, the mold cover 42 is positioned within the mold 26 with the foamable composition facing the reinforcing material 40 (FIG. 7). The foaming reaction is then permitted to proceed so as to encapsulate the other components previously placed in the mold in the cured cellular plastic thus formed.

Any suitable means may be used to hold the mold cover 42 in the desired position and to prevent it from being displaced as a result of the pressure created during the foaming reaction. As shown in FIG. 7, this may be accomplished by inserting spaced rods 70 through aligned holes 72 in the side walls 30 of the mold 26 after the mold cover 42 has been positioned within the mold. The rods 70 bearing against the reinforcing members 48 in the manner shown restrict the upward movement of the mold cover 42, establishing a limiting position of the plate 44 and thereby the thickness of the resulting panel 10.

When the plastic component 16 is a foamed polyurethane, the mold 26 is preferably preheated prior to each panel forming operation to a temperature of approximately 115° F. In many geographical areas wherein it is contemplated that the present invention will be used, this can be accomplished by merely placing the mold for a short period in direct sunlight. The preheated mold will tend to accelerate the expansion of the material during the foaming reaction so as to insure a suitably low foam density prior to curing and hardening of the plastic. To further accelerate the expansion and curing of the foamable composition 60, the reinforcing members 48 may extend continuously around the periphery of the plate 44 so as to form, together with the plate, a watertight receptacle 74. Water at an elevated temperature, e.g., 175° to 200° F., may be placed within the receptable 74 immediately subsequent to closing of the mold 26 to heat the foamable composition and thereby aid in the expansion and curing of the plastic.

By the method described, panels have been formed utilizing foamed polyurethane and having an overall thickness of ½" wherein the cellular plastic component 16 required is .10 to .12 pound per square foot of panel area and with a foam density of approximately 4 pounds per cubic foot. The minimum utilization and resulting low cost of the foamable polyurethane component thus achieved, coupled with the enhanced weathering and structural characteristics imparted by the other ingredients as hereinbefore described, make possible the use of the material of the subject invention for roofing purposes at a cost substantially less than any of the substitutes for grass thatch heretofore available. Since the equipment requirements for accomplishing the simplified method described are minimal and inexpensive, and the process can be easily performed by relatively unskilled personnel, it will be apparent that the material of the subject invention is particularly suitable for use in providing improved housing in underdeveloped areas of the world.

What is claimed is:

1. A material comprising a substantially rigid sheet of closed cell foamed resin plastic, said sheet having length and breadth dimensions and a thickness which is relatively small compared with the length and breadth dimensions, and a multilayered thickness of granules of mineral material enclosed within said foamed plastic sheet and extending over an area defined by the length and breadth dimensions thereof, said mineral thickness being disposed adjacent one surface of said sheet with the granules in close overlapping relation to form a hard abrasion and erosion resistant surface on said sheet and provide a substantially continuous barrier to the passage of ultra-violet light into the interior of said sheet in the direction of the thickness thereof.

2. The material set forth in claim 1 additionally including a reinforcing material enclosed within said sheet disposed interiorly of, and extending substantially parallel to said mineral thickness.

3. The material set forth in claim 2 wherein said reinforcing material comprises a plurality of layers formed by spaced lengths of dry vegetative material, each of said layers having the lengths of material thereof extending substantially in the same direction and adjacent layers having the lengths of material thereof extending in different directions.

4. The material set forth in claim 3 wherein said mineral material comprises stone particles which will and will not pass through U.S. Standard Sieve Series Numbers 7 and 16, respectively.

5. The material set forth in claim 4 wherein said foamed plastic material is polyurethane foam.

6. The material set forth in claim 5 additionally including a continuous paper layer adhered to said sheet on the surface thereof opposite said one surface.

7. A method for producing a sheet material comprising the steps of placing a multi-layered thickness of loose granules of mineral material over the entire bottom surface of an open top mold with the granules disposed in close overlapping relation to form a substantially continuous barrier to the passage of ultra-violet light therethrough in the direction of the thickness thereof, placing a substantially uniform thickness of foamable plastic material over said mineral material coextensive with said mineral material, closing the top opening of said mold, and expanding said foamable material to form a closed cell foamed plastic sheet completely filling said mold and encapsulating said granules within the foamed plastic sheet adjacent a surface thereof.

8. The method set forth in claim 7 additionally including the steps of placing a reinforcing material in said mold adjacent said mineral material and providing openings in said reinforcing material to permit the passage of said foamable plastic therethrough as said plastic is expanded to completely fill the mold and encapsulate said granules and said reinforcing material within the foamed plastic sheet.

9. The method set forth in claim 8 wherein said reinforcing material is formed by positioning a plurality of layers of spaced lengths of dry vegetative material upon said mineral material, each layer having the lengths of material thereof extending substantially in the same direction and adjacent layers having the lengths of material thereof extending in different directions.

10. The method set forth in claim 8 wherein the top opening of said mold is closed by a cover having a receptacle formed therein and said foamable plastic is heated by placing a liquid at a predetermined temperature in said receptacle to heat and accelerate the expansion of said foamable plastic.

11. The method set forth in claim 10 wherein said uniform thickness of foamable plastic material is formed by providing a thin sheet of web material having dimensions at least equal to those of said mold bottom, positioning said sheet beneath a blade having an edge disposed parallel to said sheet and movable in a plane parallel to said sheet, placing a quantity of unfoamed plastic material on said sheet, moving said blade relative to said sheet to form a layer of said foamable plastic on said sheet of a uniform thickness equal to the spacing between said blade edge and said sheet, and placing said sheet having the foamable plastic thereon in said mold with the foamable plastic material disposed toward said granules.

References Cited

UNITED STATES PATENTS

| | | | |
|---|---|---|---|
| 2,110,470 | 3/1938 | Norton | 161—161 XR |
| 2,855,021 | 10/1958 | Hoppe | 161—190 XR |
| 2,975,488 | 3/1961 | Brauner | 264—109 XR |
| 3,025,202 | 3/1962 | Morgan et al. | |
| 3,094,447 | 6/1963 | Chamberlain | 161—160 XR |
| 3,382,302 | 5/1968 | Marzocchi | 156—78 XR |
| 3,373,074 | 3/1968 | D'Eustachio et al. | 161—161 |

ROBERT F. BURNETT, Primary Examiner

W. A. POWELL, Assistant Examiner

U.S. Cl. X.R.

18—42; 156—78; 161—140, 159, 162; 264—45